United States Patent [19]
Inoue

[11] 4,366,358
[45] Dec. 28, 1982

[54] EDM METHOD AND APPARATUS UTILIZING SUCCESSIVELY DISPLACED MAGNETIC FIELD

[75] Inventor: Kiyoshi Inoue, Tokyo, Japan

[73] Assignee: Inoue-Japax Research Incorporated, Yokohama, Japan

[21] Appl. No.: 150,355

[22] Filed: May 16, 1980

[30] Foreign Application Priority Data

Jun. 6, 1979 [JP] Japan ................. 54-71638
Jun. 6, 1979 [JP] Japan ................. 54-71639
Jun. 6, 1979 [JP] Japan ................. 54-71642
Dec. 27, 1979 [JP] Japan ............... 54-172588
Jan. 8, 1980 [JP] Japan ................. 55-1062
Jan. 16, 1980 [JP] Japan ................. 55-3350

[51] Int. Cl.³ .......................... B23P 1/08; B23K 9/08
[52] U.S. Cl. .................................. 219/69 M; 219/123; 219/69 E; 219/69 G; 204/156; 204/129.2
[58] Field of Search .............. 219/69 M, 69 R, 69 C, 219/69 G, 69 F, 123, 121 PV, 69 E; 204/224 R, 129.2, 156

[56] References Cited

U.S. PATENT DOCUMENTS

1,711,151 4/1929 Lincoln ..................... 219/123 X
3,710,067 1/1973 Ullmann et al. ........... 219/69 C

FOREIGN PATENT DOCUMENTS

1388930 1/1965 France ........................ 219/69 M
823504 11/1959 United Kingdom ......... 219/123
543481 3/1977 U.S.S.R. ..................... 219/69 M Primary Examiner—M. H. Paschall
Attorney, Agent, or Firm—Karl F. Ross

[57] ABSTRACT

Electrical discharge machining with a tool electrode juxtaposed with a workpiece electrode to form a machining gap therebetween in the presence of a machining liquid and wherein a succession of electrical pulses are applied between the tool and workpiece electrodes to produce successive electrical discharges across the machining gap, thereby electroerosively removing material from the workpiece. As material removal proceeds the tool and workpiece electrodes are advanced relatively towards one another in a predetermined feed direction to form a cavity in the workpiece electrode. A magnetic field is applied to the machining gap over a preselected localized area of juxtaposition between the tool and workpiece electrodes; the field is displaced progressively over the entire region of juxtaposition.

22 Claims, 29 Drawing Figures

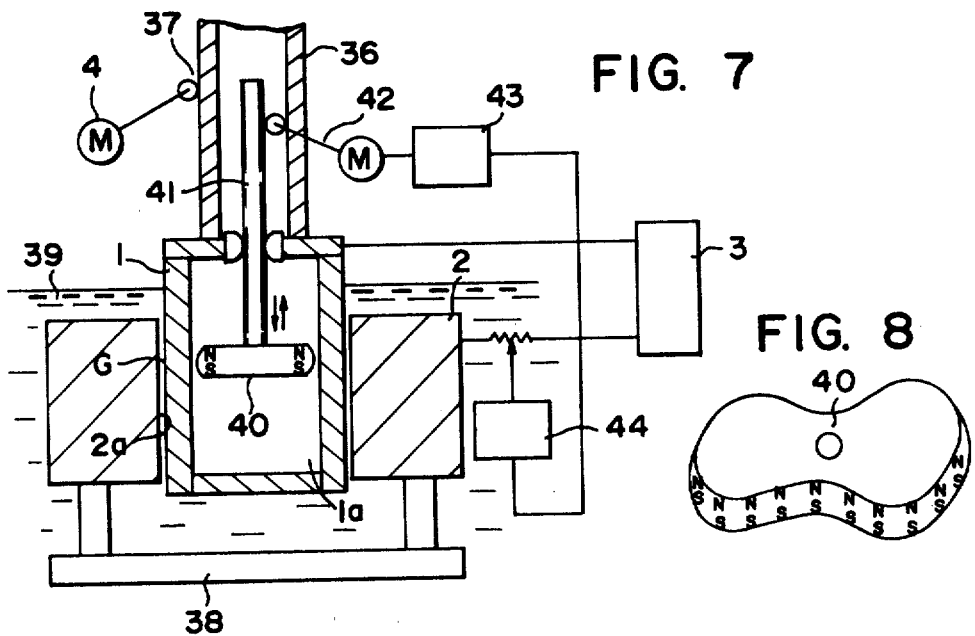
FIG. 7
FIG. 8
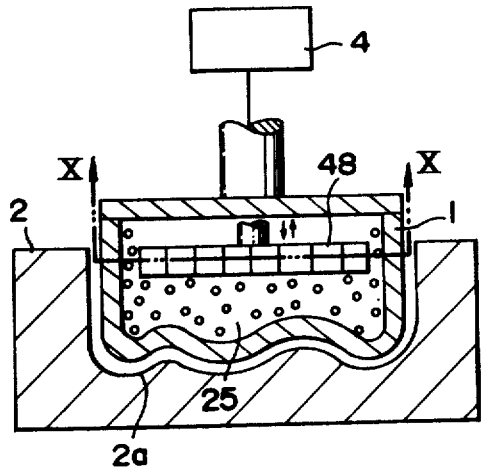
FIG. 9
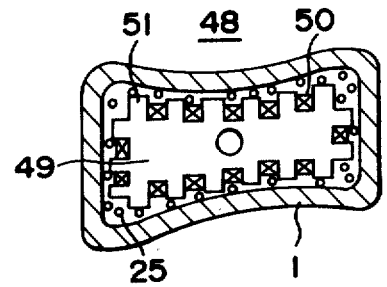
FIG. 10

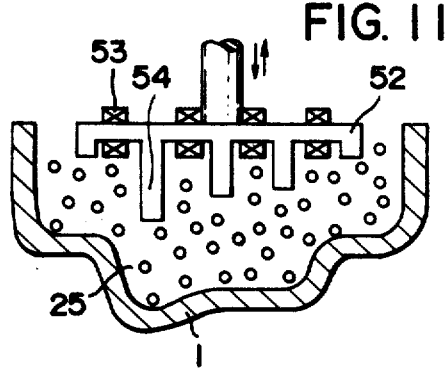
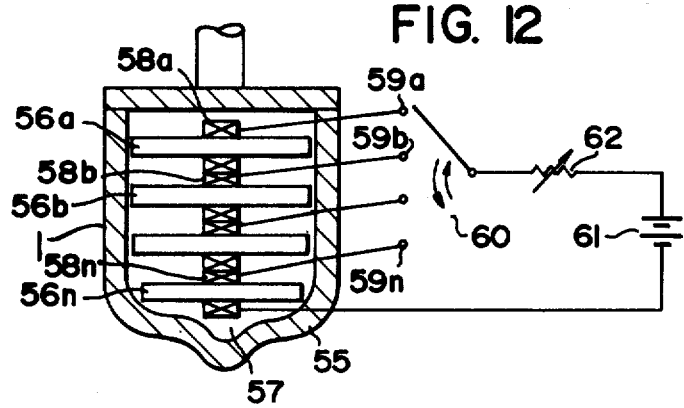
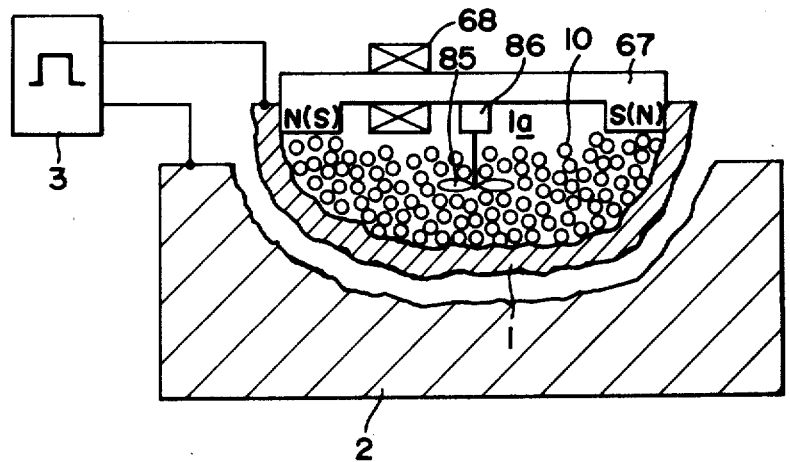

EDM METHOD AND APPARATUS UTILIZING SUCCESSIVELY DISPLACED MAGNETIC FIELD

FIELD OF THE INVENTION

The present invention relates generally to electrical discharge machining (EDM) having a tool electrode juxtaposed with a workpiece electrode to form therebetween a minute machining gap in the presence of a machining medium and a succession of electrical pulses applied between the tool electrode and the workpiece electrode to produce successive electrical discharges across the gap and thereby electroerosively remove material from the workpiece electrode; as the material removal proceeds the workpiece electrode and the tool electrode are advanced toward one another to form a cavity in the workpiece electrode. More particularly, the invention relates to an improved EDM method and apparatus in which the interaction of the high-amperage electrical discharge and an externally applied magnetic field are utilized and, moreover, applied in a novel manner in the EDM system constituted by the juxtaposed effective surfaces of the machining tool electrode and the machined workpiece electrode in the gap.

BACKGROUND OF THE INVENTION

The proposal to use an externally applied magnetic field auxiliarily in the EDM process dates back to earlier stages in the EDM history. When a magnetic field is applied externally to the region of an EDM gap, the ensuing magnetic flux interacts with the high-amperage electrical discharge current flow and causes on media generated in the gap certain dynamic actions which have not yet been fully explained. It has been recognized that these interactions facilitate the production of electrical discharges and allow the effective machining gap spacing to be advantageously enlarged so that an increase in the discharge repetition rate and an enhancement in the removal of machining chips and other products from the gap region may result to promote the stabilized EDM action and thus generally improve the EDM process. For the prior art in these particular techniques in which the magnetic field is externally applied in the EDM gap, reference should be made to my earlier contributions disclosed in Japanese Patents published under publication No. 29-6942 on Oct. 25, 1954, No. 30-833 on Feb. 11, 1955, No. 30-2943 on Apr. 28, 1955, No. 39-13297 on July 11, 1964, No. 46-11400 on Mar. 23, 1971, No. 46-12520 on Mar. 31, 1971 and No. 54-9759 on Apr. 26, 1979 as well as Japanese Utility Model Registration published under publication No. 31-5790 on Apr. 19, 1956.

In one prior-art proposal, a magnetic-field generating means is provided, e.g. one or more coils energized by an external source of direct-current or alternating-current nature and is positioned so as to develop a magnetic flux which is constantly fixed relative to the electrode system with the resulting magnetic lines of force fixedly traversing the confronting surfaces of tool and workpiece electrodes across which machining actions are in progress. The coil may be wound on the tool electrode or workpiece or both, or alternatively an iron core on which an energizable coil is wound may be located in contact with or in the proximity of the tool or workpiece electrode or both to establish the desired stationary magnetic field.

SUMMARY OF THE INVENTION

It has been found that attempts to obtain uniformity of effect by the application of a magnetic field over the entire machining zone or a portion thereof of interest, with a positionally fixed magnetic flux according to the prior teaching, are hardly effective. Thus, the application of a positionally fixed magnetic flux often causes an undesirable uncontrolled localization or concentration of electrical discharges, a phenomenon especially noticeable when the workpiece is composed of a ferrous or any other ferromagnetic material. This causes excessive and irregular wear of the tool electrode as well as impairment of machining stability and hence a reduction in removal rate.

It is, accordingly, an important object of the present invention to provide an improved EDM method and apparatus wherein the magnetic flux is controlledly applied to the EDM gap region in the manner that an improvement in machining stability, removal rate and the uniformity and ratio in relative electrode wear can be achieved.

Another significant object of the present invention is to provide a novel EDM method and apparatus whereby the applicability of the EDM process is expanded.

In accordance with the present invention, there is provided a method of electrical discharge machining wherein a tool electrode is juxtaposed with a workpiece electrode to form a minute machining gap therebetween in the presence of a machining liquid and a succession of electrical pulses are applied between the tool and workpiece electrodes to produce successive electrical discharges across the machining gap, thereby electroerosively removing material from the workpiece and wherein as material removal proceeds the tool and workpiece electrodes are advanced relatively towards one another in a predetermined feed direction to form a cavity in the workpiece electrode. The method including the steps of: applying a magnetic field to the machining gap over a preselected localized area of juxtaposition between said tool and workpiece electrodes; and successively displacing the localized magnetic field to sweep over a preselected entire area of juxtaposition between said tool and workpiece electrodes.

In accordance with the present invention, there is also provided an electrical discharge machining apparatus wherein a tool electrode is juxtaposed with a workpiece electrode to form a minute gap spacing therebetween in the presence of a machining liquid. A succession of electrical pulses are applied between the tool and workpiece electrodes to produce successive electrical discharges across the machining gap, thereby electroerosively removing material from the workpiece and as material removal proceeds, the tool and workpiece electrodes are advanced relatively towards one another in a predetermined feed direction to form a cavity in the workpiece electrode. The apparatus also includes means for applying a magnetic field to the machining gap over a preselected localized area of juxtaposition between said tool and workpiece electrodes and means for successively displacing the localized magnetic field to sweep over a preselected entire area of juxtaposition between said tool and workpiece electrodes.

BRIEF DESCRIPTION OF THE DRAWING

These and other objects, features and advantages of the present invention will become more readily apparent from the following description of certain embodiments thereof, reference being made to the accompanying drawing in which:

FIG. 7 is a schematic view partly in section diagrammatically illustrating a further embodiment of the present invention in which a permanently magnetized magnetic disk is accommodated in the electrode chamber and is displaceable vertically, i.e. in the direction in which the tool electrode is displaced relative to the workpiece;

FIG. 8 is a perspective view of the magnetic disk of FIG. 7;

FIG. 9 is a schematic view partly in section diagrammatically illustrating a further embodiment of the present invention in which an electromagnetically energized disk assembly is accommodated in the electrode internal chamber and is displaceable vertically and wherein magnetic particles or bodies may also been carried in the electrode chamber;

FIG. 10 is a cross-sectional view of the disk assembly of FIG. 9;

FIG. 11 is a schematic view generally in section illustrating a modification of the embodiment of FIGS. 9 and 10;

FIG. 12 is a schematic view partly in section diagrammatically illustrating a further modified electromagnetically energized disk assembly fixed in the electrode chamber and having a plurality of magnetic disks supported in parallel with one another and spaced apart in the vertical direction;

FIG. 19 is a schematic view illustrating a further embodiment similar to that of FIG. 18, including also means for mechanically agitating the magnetic particles in the electrode chamber;

SPECIFIC DESCRIPTION

Figure 1:
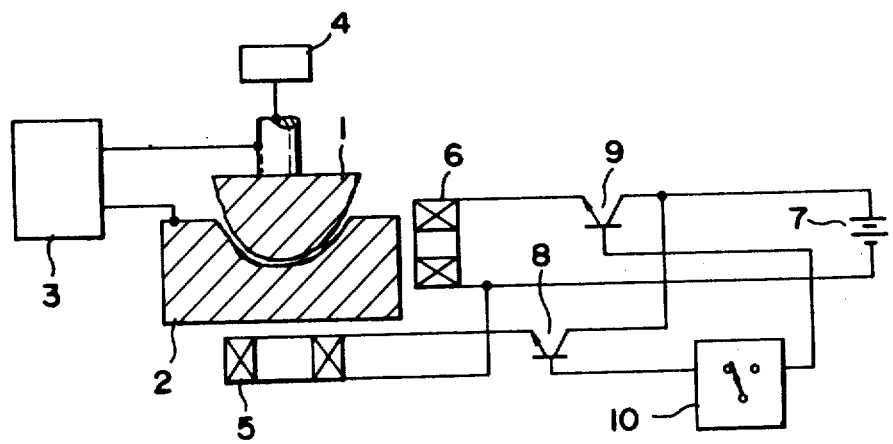
FIG. 1 is a schematic view diagrammatically illustrating an embodiment of the present invention in which two or more electromagnetic coil means are fixedly arranged at preselected spaced-apart locations about the EDM gap zone and energized in sequence to produced successively displaced magnetic fluxes.

Referring first to FIG. 1, a typical EDM system comprises a tool electrode 1 juxtaposed with a workpiece electrode 2 to form a machining gap G therebetween, the gap being filled with an EDM liquid, e.g. Kerosene, transformer oil or distilled water supplied continuously or in pulses from a nozzle or any other supply unit (not shown). An EDM power supply 3 is connected between the tool electrode 1 and the workpiece electrode 2 to apply a series of machining pulses between them to produce across the gap G a succession of electrical discharges which electroerosively remove material from the workpiece electrode 2. An electrode feed servo unit 4 is shown associated with the tool electrode 1 to effect the relative advance movement of the tool 1 towards the workpiece 2 required to maintain the size of the machining gap G substantially constant as the material removal from the workpiece 2 proceeds. The servo unit 4 is also responsive to a gap short-circuiting condition or excessively low resistance or impedance condition which may occur in the machining gap G from time to time. In accordance with the customary EDM practice, the system may also be provided with an electrode reciprocating unit (not shown) associated with the movable electrode 1 to periodically retract the electrode 1 away from the workpiece 2, thereby promoting gap flushing or chip removal in the region of the machining gap G.

In accordance with the present invention, a plurality of magnetic-field generators, shown by two coils 5 and 6, are provided adjacent the region of the machining gap G to successively produce magnetic fields oriented in different directions. The coils 5 and 6, here arranged in a region which surrounds the workpiece electrode 2 being machined by the tool electrode 1, are connected in parallel to a common power supply 7 via switches 8 and 9, respectively, which are controlled by a switching timer 10. The switching timer 10 maybe any known timer, such as an astable or bistable multivibrator device, which alternately provides a first and a second output pulse which are applied to the switches 8 and 9, respectively. When the switch 8 is energized with the first output pulse of the timer 10, the coil 5 is energized by the power supply 7 to produce a magnetic field oriented in a first direction, here in the vertical or machining-feed direction in which the tool electrode 1 is advanced by the servo-feed unit 4 to penetrate into the workpiece electrode 1. When the switch 9 is energized with the second output pulse of the timer 10, the coil 6 is energized by the power supply 7 to produce a magnetic field oriented in a second direction, here in a horizontal direction orthogonal to the machining-feed direction. The resulting magnetic fluxes oriented in the mutually orthogonal directions are applied successively to the region of the machining gap G.

Magnetic fields successively generated and applied to the gap G region selectively in the varying directions should each be of a field strength sufficient to produce a magnetic flux density ranging generally between 100 and 1000 Gauss and, preferably, not less than 200 Gauss. As has been recognized, each resulting magnetic flux in succession, when so adjusted, as such a strong interaction with the discharge current in the gap G applied between the tool electrode 1 and the workpiece electrode 2 in the form of successive time-spaced pulses as to lead the machining action to favorable results. Thus, a favorable gap condition is created which facilitates gap breakdown and sparkover by an individual discrete machining pulse so that successive pulses have a uniform discharge characteristic while permitting the effective sparkover distance of the machining gap G to be increased, phenomena attributable to the magnetic tendency of magnetically susceptible particles present in the machining gap G and the electromagnetic force acting on the discharge current.

Thus, in this embodiment, the magnetic fields oriented in the vertical and horizontal directions are alternately produced to alternately apply the corresponding fluxes to the region of machining gap G when the two coils 5 and 6 are alternately energized with the two switches 8 and 9 alternately turned on. The rate of alternation or switching should generally range between 0.1 and 100 Hz. It appears that no higher rate is required or meaningful. By periodically changing the direction in which the magnetic flux is applied to the region of machining gap G, there appears to develop a random agitation of magnetic particle suspensions in the gap G which tend to concentrate under a static magnetic field. At any event experimentation has shown that the localized development of electrical discharges which is often the case with a static magnetic field, is effectively avoided while the advantageous effect by the magnetic field to substantially increase the effective gap spacing is retained which promotes clip removal from the machining gap G region. Thus, a highly stable and satisfactory machining operation results which permits an increased removal rate and better surface quality, hence a substantially improved machining efficiency.

Figure 2:
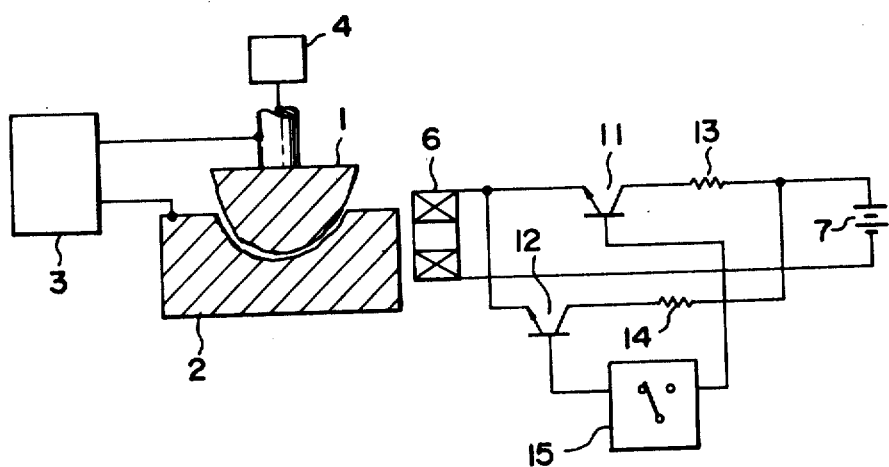
FIG. 2 is a schematic view illustrating a modification of the embodiment of FIG. 1 in which the energizing current for each said coil means is varied.

In a modified embodiment shown in FIG. 2, the energization current applied to one or both of the coils 5 and 6 is varied in intensity to change the strength of the localized magnetic field with time. As shown, the coil 6 is connected to the power supply 7 via a pair of parallel circuits including serial connections of a switch 11 and a resistor 13; and a switch 12 and a resistor 14, respectively, the switches 11 and 12 are energizable by a switching timer 15 which may again be an astable or bistable multivibrator device. The resistors 13 and 14 variably set the resistance in the corresponding connection circuits at different values so that as the switches 11 and 12 are alternately turned on by the timer 15, different energizing currents develop in sequence through the coil 6 to develop magnetic fields of different field strengths in sequence.

Figure 3:
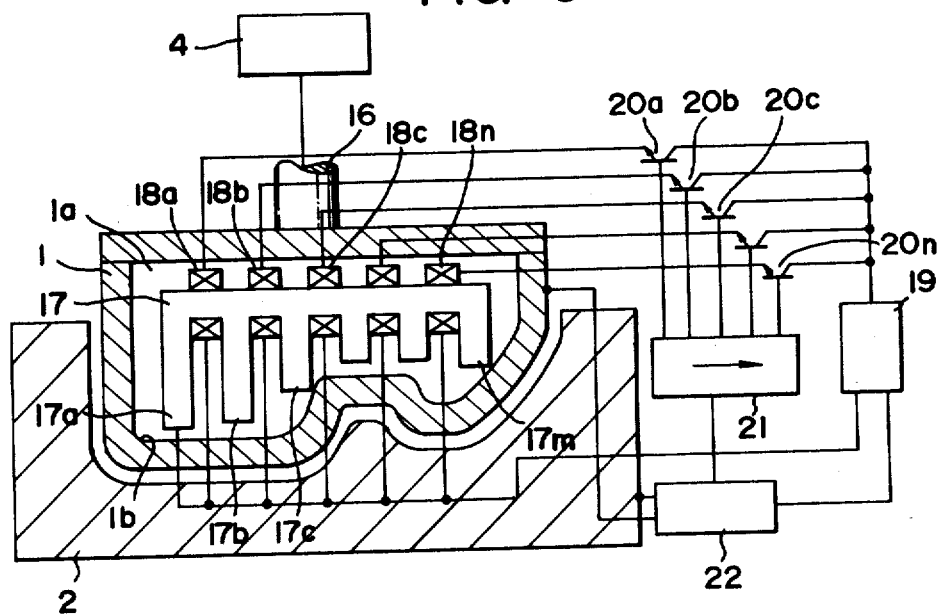
FIG. 3 is a schematic view partly in section diagrammatically illustrating an embodiment of the present invention in which a plurality of magnetic pole producing coils are arranged in distributed in a manner chamber formed in a tool electrode and energized in sequence.

FIG. 3 shows a further embodiment of the present invention in which the tool electrode 1 composed of copper, brass, graphite or any other non-magnetic or weakly magnetic material and formed with a machining surface by pressing, cutting or electroforming, is provided with an internal chamber 1a having magnetic-field generating means arranged therein. The tool electrode 1 is carried by a spindle 16 whose vertical movement is controlled by the electrode servo unit 4 as previously shown to maintain the length of the machining gap G substantially constant as machining proceeds. In this and certain other FIGURES that follow, the machining power supply as well as the machining liquid supply is omitted from illustration. The workpiece 2 is a ferrous material which is magnetically permeable.

The magnetic-field generating means here comprises a core member 17 and a plurality of coils 18a, 18b, 18c ... and 18n wound thereon and energized by a common DC power supply 19 via parallel switching circuits 20a, 20b, 20 c, ... and 20n, respectively, the switches in these circuits 20a, 20b, 20c, ... and 20n being controlled by a control pulser 21. The core member 17 has a plurality of closely spaced projections 17a, 17b, 17c, ... and 17m which serve as divided magnetic poles and which conform in their individual lengths substantially to the shape of the inner face 1b in the hollow tool electrode 1 and thus generally to the shape reproduced in the workpiece 2. The coils 18a, 18b, 18c ... and 18n are wound on the core member 17 so that the adjacent projections 17a and 17b, 17b and 17c, ... and 17m constitute the two opposite N and S poles. The switching control circuit 21 is basically a time-division pulser adapted to furnish a repetition of the required set of output pulses in sequence to be applied respectively to the switches 20a, 20b, 20c, ... and 20n and may be a ring-counter device of well known configuration.

In operation, the control circuit 21 turns on and off the switches 20a, 20b, 20c, ... , and 20n in sequence to energize the coils 18a, 18b, ... , and 18n successively. Each coil, when energized, magnetically excites the adjacent two projections or poles and creates a localized magnetic flux which emanates from one of the projections (north pole) and returns to the other (south pole) after traversing the adjacent gap zone forth and back along a U-shaped path including the workpiece 2. As the successive switching advances, a progressive displacement of this localized magnetic flux over the entire gap region of interest is effected. In this connection, any desired displacement pattern can be obtained by determining the order of energization of coils 18a, 18b, 18c, ..., and 18n accordingly. The core member 17 naturally need not be of an integral body but may be divided into separate pieces so that each piece individually carries the two magnetic pole projections and is individually wound by one exciting coil.

A highly stable EDM operation is achieved by establishing a localized magnetic field and successively displacing the field over the entire machining region. The magnetic field which is locally set up is sufficient to produce a magnetic flux density ranging between 100 and 1000 Gauss. As has been noted, the magnetic field when created at the machining gap externally supplied with successive machining pulses factilitates sparkover and gap breakdown for each pulses and serves to increase the effective machining gap spacing. The successive displacement of a locally produced magnetic field allows a uniform development of successive electrical discharges over the entire machining region; practically no discharge concentration occurs. This appears to be due to a dynamic fluctuation and agitation of magnetic chip particles, decomposed gases and ions in the machining gap G created under the moving field, which also permits these gap detritus to be promptly carried away from the machining region. In general, in EDM the rate of decomposition of the machining liquid is determinative of the machining speed. Here, since the rate of detritus removal from the gap region is enhanced and the rate of decomposition of the machining liquid is accelerated by discharge stabilization, an increase in machining speed up to 30% readily results.

By setting up a localized magnetic field and successively displacing the field over the entire machining area, machining is permitted to occur with an effectively increased gap spacing and with stability. Since the increase in the gap spacing is precisely controllable as a function of the field strength of the localized magnetic field, a single tool electrode can be used to perform both rough and finish operations. Further, any machined cavity with a local enlargement can be achieved.

The field strength of each local magnetic field is readily controlled for a desired mode of machining by controlling the energization current for each exciting coil 18a, 18b, 18c, ..., 18n.

It should also be noted that a change in gap conditions may make it desirable to change the energization and displacement parameters of the localized magnetic field. To this end, a gap detector/control unit 22 is connected to the tool electrode 1 and the workpiece electrode 2 to provide a control signal which acts on the power supply 19 and/or the switching control circuits (ring counter) 21. When the former is acted upon, the field strength of the magnetic field is controlled. When the latter is acted upon, the rate of displacement of the localized magnetic field is controlled.

Figure 4:
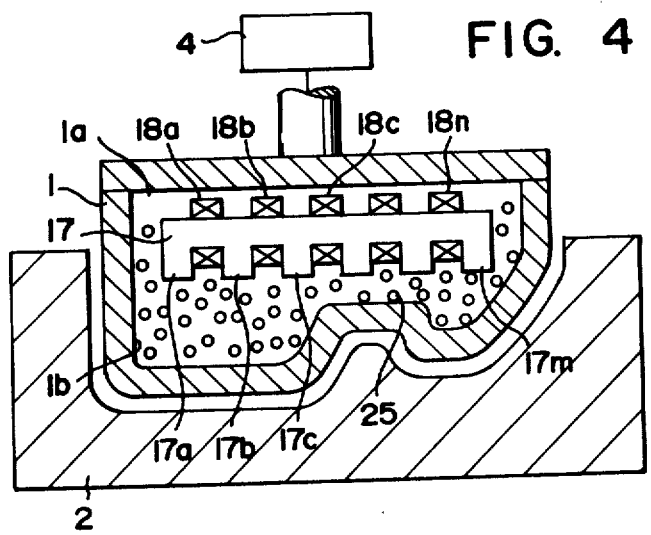
FIG. 4 is a schematic view partly in section illustrating a modification of the embodiment of FIG. 3 in which magnetic particles or bodies are also received in the electrode chamber which accommodates a magnetic coil assembly.

In a modified embodiment of FIG. 4, the core member 17 is provided with magnetic poles 17a, 17b, ..., 17m of generally equal projecting length and particles 25 of a magnetically permeable material in a spherical or any other form are packed within the electrode chamber 1a in the space between the core member 17 and the inner wall 1b of tool electrode 1 towards the workpiece 2 to serve as distributed magnetic conductors. This arrangement ensures a uniformity of the passage and extension of magnetic lines of force generated at each core location over the adjacent gap area and lends itself to a variety of shapes of the tool electrode 1.

Figure 5:
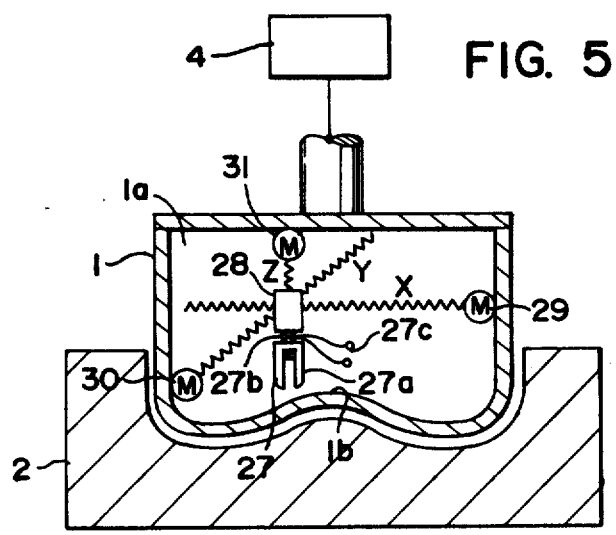
FIG. 5 is a schematic view partly in section diagrammatically illustrating an embodiment of the present invention in which the tool electrode accommodates in an interior chamber a magnetic head movable along three axes.

In the embodiment shown in FIG. 5, the moving magnetic field is produced by a magnetic head 27 carried by a support 28 displaceable within the electrode chamber 16 along an X-axis, Y-axis and Z-axis by means of motors 29, 30, and 31, respectively, within the electrode chamber 1a. During the course of an EDM operation, the motors 29, 30 and 31 are driven in accordance with control drive signals furnished by an externally provided numerical controller (not shown) to displace the magnetic head 27 along the rear face 1b of the machining electrode, thereby continuously displacing the local magnetic field generated by the magnetic head 27.

Figure 6:
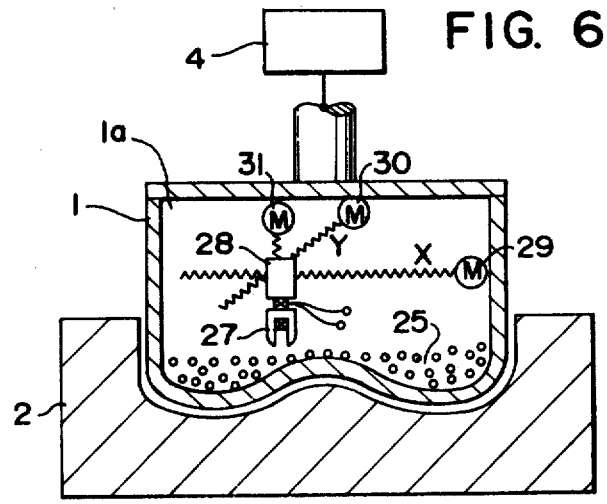
FIG. 6 is a schematic view partly in section illustrating a modification of the embodiment of FIG. 5 in which magnetic particles or bodies are also received in the electrode chamber.

FIG. 6 shows a modification of the embodiment of FIG. 5 in which magnetically conductive particles 25 are held in the chamber 1a so as to be traversed by magnetic lines of force generated by the moving magnetic head. In this embodiment, the Z-axis displacement motor 31 and the associated drive components may be dispensed with when a sufficient amount of magnetic particles are loaded in the chamber 25.

In FIGS. 5 and 6, the magnetic head 27 may either be of an electromagnetic type having a core 27a, an exciting coil 27b and an energization source 27c for the coil 27b as shown, or of a permanent-magnet type.

In FIG. 7, there is shown a further embodiment of the present invention which is particularly suitable for performing a finish EDM operation. The system shown includes a hollow tool electrode 1 carried by a spindle 36 which is driven vertically by an electrode-feed servo unit 4 as previously described via a rack and pinion arrangement 37. A workpiece 2 is shown mounted on a base 38 and immersed in an EDM liquid 39 in a worktank (not shown), and spacedly juxtaposed with the tool electrode 1. The illustrated position indicates that the tool electrode 1 has completed a preceding rough EDM operation with machining pulses furnished by the EDM power supply 3 and with the vertical feed controlledly effected by the servo unit 4 to penetrate the workpiece 2 as shown and to generate a rough-machined cavity 2a therein.

Disposed within the hollow electrode 1 or the chamber 1a is a magnetic disk 40 having a peripheral shape corresponding to the electrode cross section and hence the cross section of the cavity 2a and magnetized uniformly in the direction of its thickness as diagrammatically shown in FIG. 8 to provide a fixed magnetic field of a toroidal configuration. Here again, the tool electrode 1 is constituted by copper, graphite or any suitable material which is non-magnetic so that the resulting magnetic lines of force traverse the machining gap G containing magnetic particles dislodged from a ferrous workpiece material. The magnetic disk 40 is carried by a shaft coaxial with the tool electrode 1 and displaced by a motor 42 driven by a control circuit 43 for vertical reciprocation within the chamber 1a. A gap detector 44 may be provided to respond to the gap current supplied from the EDM power supply to provide a gap-state signal to the reciprocation control circuit 43.

The finish EDM operation for the rough-machined cavity 2a is carried out with the aid of a magnetic field generated by the moving magnetic disk 40 by holding the tool electrode 1 in situ or at a position at which the rough-machining step has been completed. As noted previously, the magnetic field serves to increase the effective gap spacing G spanned by electrical discharges. Thus, electrical discharges take place between the tool electrode 1 and the workpiece cavity 2a, preferentially in a region which is traversed by the magnetic field or the region adjacent or proximal to the magnetic disk 40. As the magnetic disk 40 is displaced upwardly or downwardly relative to the fixed tool electrode 1 and the workpiece 2, the discharge-striking region displaces accordingly to finish-machine the rough-machined cavity 2a. Here again, a field strength sufficient to produce a flux density of 100 to 1000 Gauss is suitable. The rate of displacement of the magnetic disk 40 should be 0.33 cm$^2$/sec. for an average machining current of 10 amperes. The finish operation may be completed by a single up or down movement of the magnetic disk 40 to cover the entire length of the cavity 2a. Of course, rather than the single run, a reciprocation of predetermined numbers of up and down displacements may also be employed.

The gap detector 44 is used to optimize development of magnetically assisted machining discharges in accordance with changing conditions in the machining gap G. This can be achieved by controlling the displacement of the magnetic disk 40 at a rate which is proportional to the magnitude of average machining current through the gap G.

The magnetically assisted finish EDM operation can also be performed on a three-dimensional cavity 2a as shown in FIG. 9 with a correspondingly shaped tool electrode 1, the cavity being previously rough-machined by the same electrode. In the arrangement in FIG. 9, the magnetic disk assembly 48 is of an electromagnetic type having a core member 49 and a coil 50 wound thereon to provide a plurality of projecting magnetic poles 51 distributed along its periphery as illustrated in FIG. 10. The disk assembly in this embodiment as well is displaced up and/or down to vertically displace the magnetic poles 51 relative to the fixed cavity 2a to perform the finish-machining of the lateral surface thereof. In addition, magnetic particles 26 are loosely loaded within the hollow electrode 1 to improve the uniform distribution of magnetic fluxes generated at the pole members 51 over the entire cavity surface 2a.

A modified arrangement shown in FIG. 11 makes use of a core member 52 wound by an electromagnetic coil 53 and having a plurality of downwardly projecting magnetic poles 54, together with magnetic particles 25 loosely loaded within the hollow electrode 1. This arrangement ensures that when the core assembly 52 is at the lowermost position, magnetic fluxes distribute with greater uniformity over the bottom surface of the cavity 2a.

FIG. 12 shows a further embodiment of the invention for vertically displacing a local magnetic field horizontally acting on a workpiece cavity. A magnetic assembly 56 is here fixed in a hollow electrode 55 and consists of a plurality of iron plates or disks 56a, 56b, ... and 56n mounted spacedly in parallel with one another on a central support 57, the plates or disks being respectively associated with coils 58a, 58b, ... 58n having individual input terminals 59a, 59b, ... and 59n selectively connectable via a switch or commutator 60 to a DC source 61 including a variable current setting resistor 62. The switch or commutator 60 is operated by a control circuit (not shown) to successively connect the input terminals 59a, 59b, ... and 59n to the source 61 thereby successively energizing the coils 58a, 58b, ... and 58n. This brings about a successive magnetic excitation of the plates or disks 56a, 56b, ... and 56n to produce a magnetic field in their respective horizontal zones. As the position of magnetic excitation shifts successively, there results a vertical displacement of the magnetic field.

Figure 13:
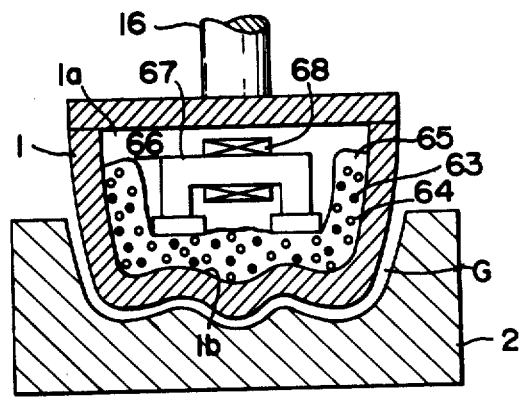
FIG. 13 is a schematic view generally in section diagrammatically illustrating a further embodiment of the present invention in which the electrode internal chamber accommodates an electromagnetic pole assembly as well as a combination of magnetic and non-magnetic particles or bodies.

FIG. 13 shows a further embodiment of the invention in which a combination of magnetic materials and nonmagnetic materials is used as a magnetic-flux distributor. Here a mixture of a magnetic material in a particulate form 63 and a nonmagnetic material also in a particulate form 64 which are carried by an elastomeric material 65 as a matrix is disposed in the region of a rear face 1b of the hollow tool electrode 1 which as in the previous embodiments incorporates within its internal chamber 1a a magnetic assembly. The magnetic assembly indicated by 66 is shown comprising an electromagnet consisting of a U-shaped core 67 and a coil 68 wound thereon and energized by an external source (not shown). The magnetic assembly 66 is arranged in the chamber 1a to have its end pole members 67a and 67b in contact with the matrix 65 and is vertically displaced and reciprocated by drive means (not shown) to successively displace and reciprocate the generated magnetic field. During the displacement or reciprocation, the matrix 65 resiliently supports the pole members 67a and 67b and the uniform mixture of magnetic particles 63 and nonmagnetic particles 64 therein provides highly satisfactory magnetic paths for magnetic fluxes to extend between the pole members 67a and 67b and the workpiece 2 uniformly over the entire area of the machining gap G.

Figure 14A:
FIGS. 14A, 14B, 14C and 14D diagrammatically illustrate various different combinations of magnetic and non-magnetic bodies of FIG. 13.
Figure 14B:
Figure 14C:
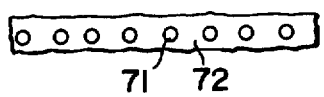
Figure 14D:

FIGS. 14A, 14B, 14C and 14D illustrate various other forms of the combination of magnetic and nonmagnetic materials for use as the flux distributors in accordance with the present invention. The form of FIG. 14A employs magnetic and nonmagnetic wires 68a and 68b arranged alternately side by side and bonded together, say, by a resin to constitute a sheet-like material. In the form of FIG. 14B magnetic particles 69 and nonmagnetic particles 70, both irregular, are mixed together in a matrix. In the form of FIG. 14C, a magnetic particulate or elongate material 71 is distributed in a nonmagnetic elastomeric material 72. The form of FIG. 14D makes use of small flake-like magnetic pieces 73 in parallel alignment and embedded in a nonmagnetic power 74.

In a system shown in FIG. 15, a magnetic assembly 75 incorporated in the internal chamber of the tool electrode 1 comprises a plurality of pole members 76a, 76b, 76c ... and their associated coils 77a, 77b, 77c ... arranged generally in the manner described in connection with FIGS. 3 and 4. The coils 77a, 77b, 77c ... are here energized by a three-phase AC source 78 to successively produce local magnetic fields in the region of poles 76a, 76b, 76c ... in any one of various possible patterns. The tool electrode 1 has a laminated structure consisting of three thin plates 1l, 1m and 1n. The EDM power supply 3 is also shown connected between the tool electrode 1 and a workpiece electrode 2.

Figure 16A:
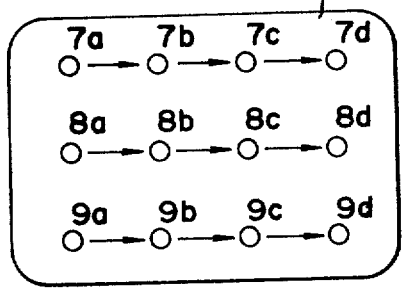
FIGS. 16(A), 16(B) and 16(C) are diagrammatic views illustrating various ways in which magnetic poles of the system of FIG. 15 are sequentially activated.
Figure 16B:
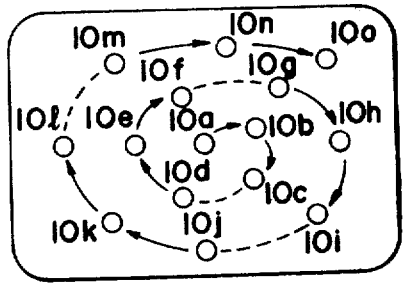
Figure 16C:
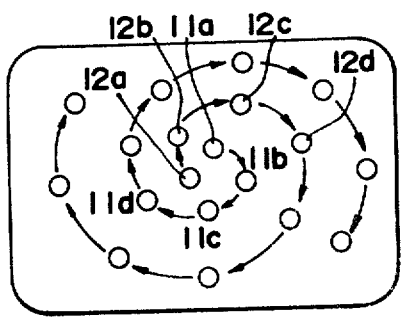

FIG. 16 shows various forms in which the localized magnetic field is produced and displaced over the effective area of the tool electrode 1 or the machining gap G as the coils 76a, 76b, 76c ... are successively energized to magnetically excite poles 77a, 77b, 77c ... successively. In the form of FIG. 16(A), the coils or pairs of poles 7a, 7b, 7c, 7d; 8a, 8b, 8c, 8d; 9a, 9b, 9c, 9d are arranged in three rows and four columns and the successive energization or excitation for each row is effected in the manner of 7a→7b→7c→7d; 8a→8b→8c→8d; 9a→9b→9c→9d. The energization or excitation for different rows may be effected either synchronously or with a predetermined phase shift. In the form of FIG. 16(B), coils or pairs of poles 10a, 10b, 10c, 10d, 10e, 10f, 10g, 10h, 10i, 10j, 10k, 10l 10m, 10n and 10o are arranged in a vortex pattern and are connected to the three-phase AC source 78 in such a manner that, for example, the units 10a, 10d, 10g, 10j, and 10m are selectively energized by the first phase, the units 10b, 10e, 10h, 10k and 10n by the second phase and the units 10c, 10f, 10i, 10l and 10o by the third phase thereof to cause the magnetic field to displace from inner portions outwardly along a vortex path. In the form of FIG. 12(c), there are two series of units constituting a generally vortex pattern in which the successive energization or excitation is effected such as 11a→11b→11c→11d . . . ; and 12a→12b→12c→12d . . .

Each localized magnetic field is, as mentioned previously, sufficient to produce a magnetic flux density in the range between 100 and 1000 Gauss. By establishing a localized magnetic field and displacing it successively, a uniform development of machining discharges over the entire gap area is ensured. When the displacement of the localized magnetic field is effected at an increased speed, say, of 1 to 100 m/sec there will be produced a displacement of the discharge column within a single applied machining pulse so that the resulting elongation of the discharge crater on the workpiece surface yields an improved surface finish.

Figure 17:
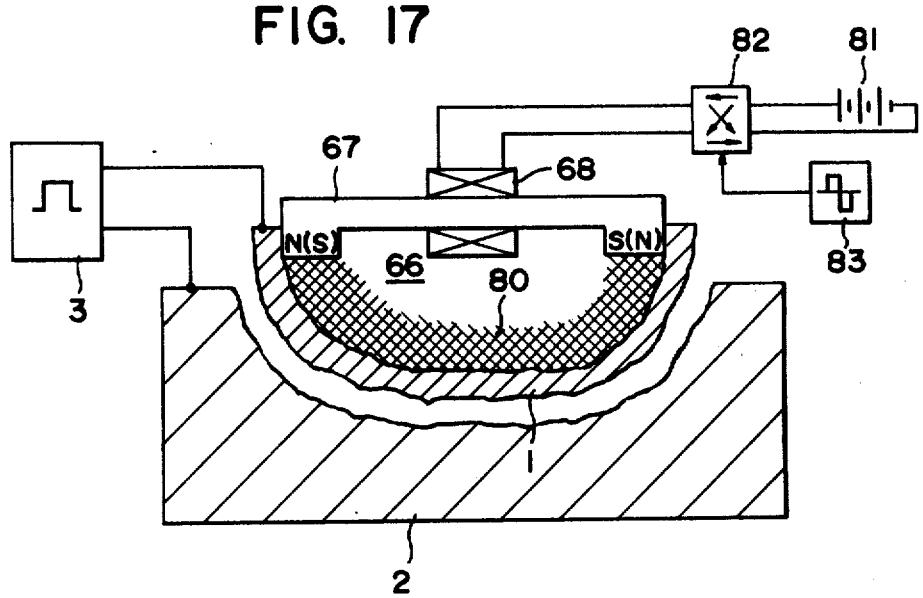
FIG. 17 is a schematic view partly in section diagrammatically illustrating a modification of those embodiments illustrated in FIGS. 2, 6, 9, 11 and 13 wherein a mass of fibrous materials is used as the flux distributing magnetic conductor.
Figure 18:
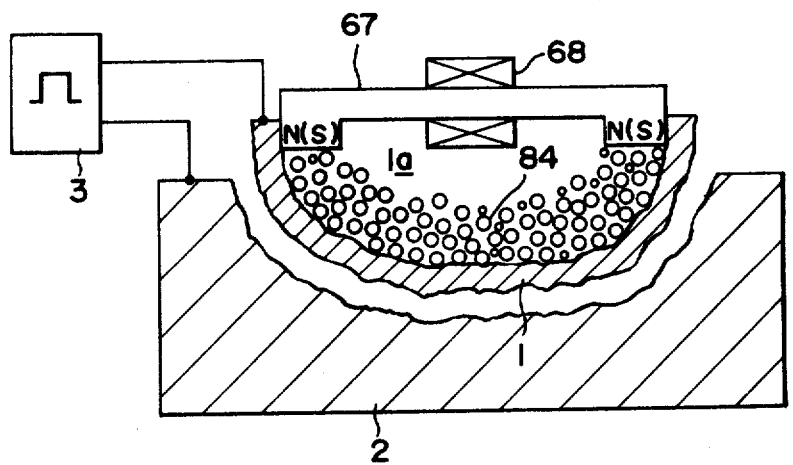
FIG. 18 is a schematic view generally in section illustrating an alternative modification in which the magnetic conductor is constituted by a mass of spherical magnetic particles.

FIG. 17 shows a modification of those embodiments illustrated in FIGS. 2, 6, 9, 11 and 13 in which modification of a mass of fibrous material 80 is used as the magnetic-flux distributors which ensures a uniform distribution of the magnetic fluxes generated by the electromagnetic assembly 66 of the type previously shown. In this system, the assembly 66 is energized by a DC source 81 via a current commutator 82 controlled by an oscillator 83 so that the magnetic polarity generated at the poles 67a and 67b are periodically altered. The fibers 80 are composed of nickel, iron, chromium, cobalt, magnetic stainless steel or like ferromagnetic material, and may be set in position by a suitable adhesive. In FIG. 18, the magnetic flux distributors are constituted by spherical particles 84 of a ferromagnetic material as listed above. The spherical particles 84 may be agitated within the electrode chamber 1a, say, by a fan 85 rotated by a motor 86 as illustrated in FIG. 19 to improve the dynamic flux distribution over the entire working area.

Figure 15:
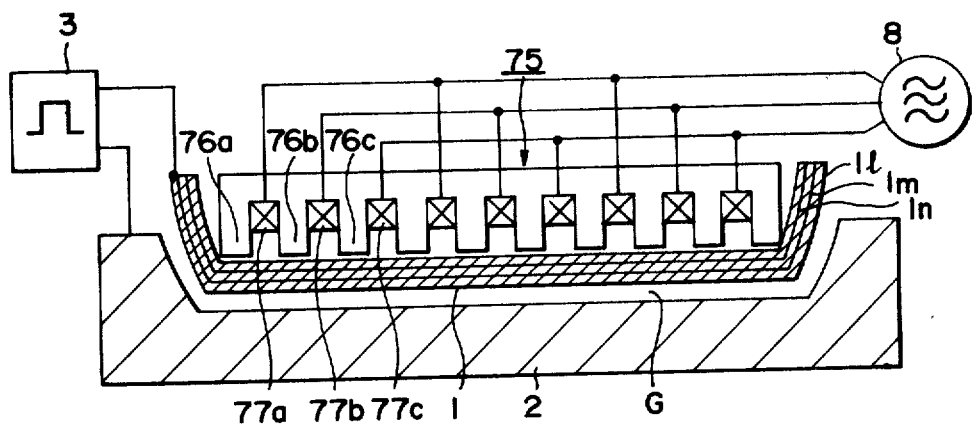
FIG. 15 is a schematic view partly in section diagrammatically illustrating a further embodiment of the present invention in which a plurality of magnetic coils disposed in the internal chamber of the tool electrode are energized by a three-phase alternating-current source to successively activate the associated magnetic poles to produce sequentially displaced magnetic fluxes throughout the machining gap.
Figure 20:
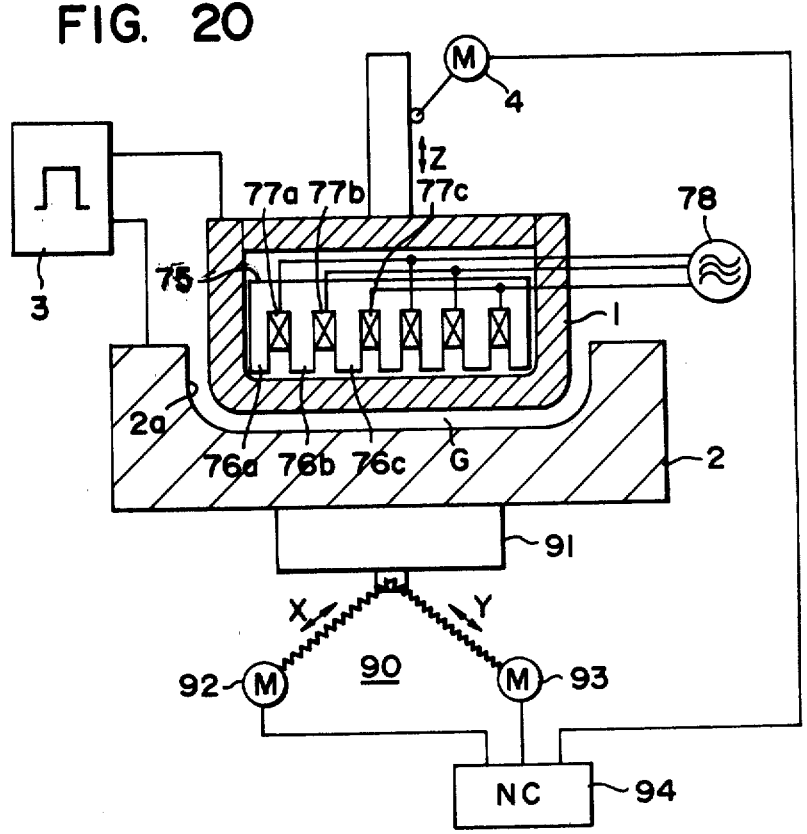
FIG. 20 is a schematic view diagrammatically illustrating a further embodiment similar to those of FIGS. 3 and 5, also including means for relatively displacing the tool electrode and the workpiece electrode in a direction orthogonal to a normal machining feed direction.

FIG. 20 shows a modification of the embodiment illustrated in FIG. 15 in which the magnetic assembly 75 in the tool electrode 1 is used in association with a drive system 90 for laterally displacing a worktable 91 which carries the workpiece 2 relative to the tool electrode 1 in the course of finish EDM of the workpiece cavity 2a. The lateral drive system 90 includes a first motor 92 for displacing the table 91 along the X-axis and a second motor 93 for displacing the table 91 along the Y-axis. The motors 92 and 93 are controlledly driven by output signals furnished by a numerical controller 94 which has a further output leading to the servo unit 4 for controlledly driving the tool electrode 1 relative to the workpiece electrode 2 along the Z-axis or in the vertical direction.

Figure 21:
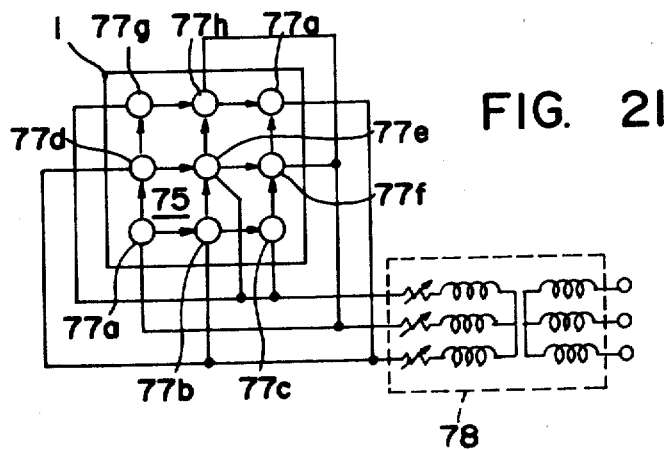
FIG. 21 schematically illustrates a manner in which the Various magnetic poles in the system of FIG. 20 are activated in sequence when the associated coils are energized by the three-phase AC source.

The tool electrode 1 is shown in FIG. 21 to have, for example, a square cross section with the magnetic assembly 75 consisting of nine exciting coils 77a, 77b . . . 77i energizable by a three-phase AC source 78 to provide at projections 76a, 76b, 76c . . . (not shown) the correspondingly induced magnetic poles. Here, for example, coils 77a, 77f and 77h; coils 77b, 77d and 77i; and 77c, 77e and 77g are shown energized simultaneously by the first, second and third phases of the three-phase AC source 78, respectively so that in each set a magnetic field generated displaces in the order of the regions of 77a→77b→77c; 77d→77e→77f; and 77g→77h→77i, to sweep over the entire area of the machining gap G successively as in the previous embodiment. In this embodiment, the successive displacement of the magnetic field is correlated with the lateral displacement of the tool electrode 1 relative to the workpiece 2 effected by the drive system 90.

Figure 22:
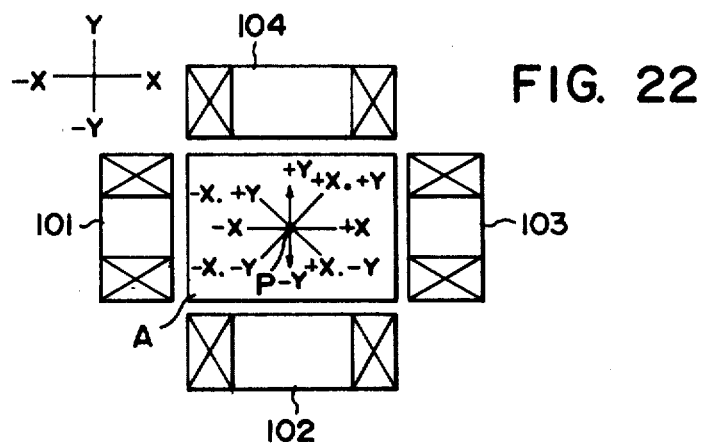
FIG. 22 is a schematic plan view illustrating a plurality of coils disposed around the machining gap in an array in an X-Y plane and a manner of successive localization of the magnetic flux in the gap area when these coils are energized in sequence.

FIG. 22 shows a further embodiment of the present invention in which four electromagnetic coils 101, 102, 103 and 104 are arranged about a square-shaped machining gap area A symmetrically in an X-Y plane and energized selectively to provide a magnetic field in the directions of +X, +Y, −X and −Y coordinates, respectively. Adjacent coils may be energized simultaneously. Thus, when coils 101 and 102 are energized, a composite magnetic field is generated in the direction of +X·−Y. Likewise, when coils 102 and 103; coils 103 and 104; and coils 104 and 101 are energized simultaneously, composite magnetic fields in the directions of −X·Y, −X·−Y and +X·−Y, respectively.

Figure 23:
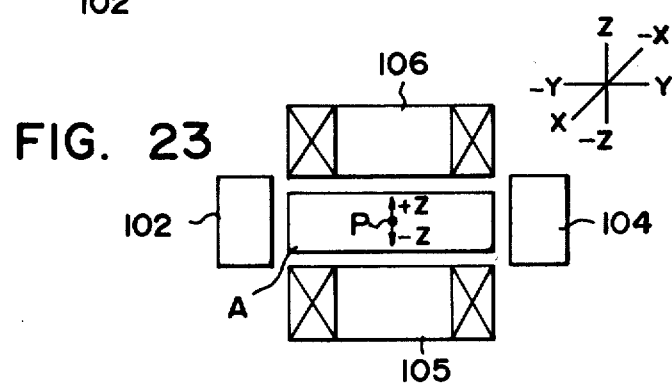
FIG. 23 is a schematic view in elevation illustrating a different arrangement of coils wherein the coils are disposed around the machining gap in a Y-Z plane.

In a system of FIG. 23, two coils 105 and 106 to alternative to the two coils 101 and 103 or additional to the four coils 101, 102, 103 and 104 of the system of FIG. 22 are disposed and energized to apply the magnetic field in the direction of +Z and −Z coordinates, respectively.

Figure 24:
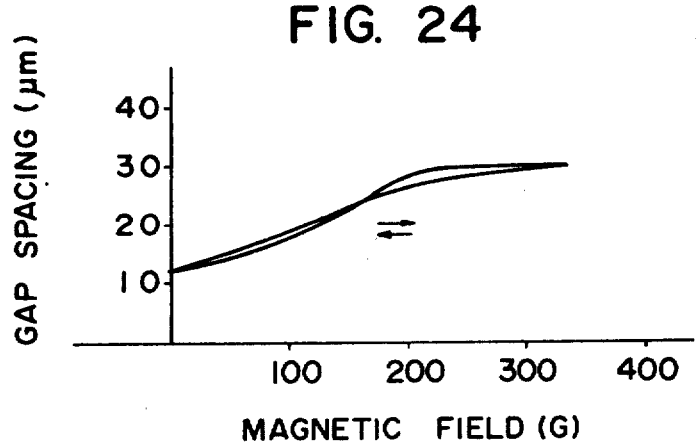
FIG. 24 is a graph showing the effective EDM gap spacing versus the magnetic field applied in the gap area.

The formation of a magnetic field in each direction is effected by selective energization of the corresponding coil or corresponding pairs of coils and successive field formations are produced in accordance with a predetermined program. Over the machining area A, of course, a succession of machining pulses are applied across the machining gap between the tool electrode and the workpiece electrode to create successive electrical discharges. When a magnetic field is superimposed upon the discharge current, a strong interaction develops between them to bring about favorable effects which, as noted before, include promotion of each electrical discharge and increase of the effective gap spacing. FIG. 24 shows in a graph a relation between the effective gap spacing plotted in $\mu$m versus the magnetic field plotted in terms of flux density in Gauss. It is seen that when no magnetic field is applied, the gap spacing is of a value of 12 to 13 $\mu$m, which increases to 20 $\mu$m when a magnetic field of a strength of 100 Gauss is applied, the gap spacing further increasing to 25 to 30 $\mu$m with the field strength increased to 200 to 300 Gauss. Two curves in the graph show that substantially the same changes take place in the gap spacing when the direction of a magnetic field is reversed.

What is claimed is:

1. In a method of electrical discharge machining wherein a tool electrode is juxtaposed with a workpiece electrode to form a machining gap therebetween in the presence of a machining liquid and a succession of electrical pulses are applied between the tool and workpiece electrodes to produce successive electrical discharges across the machining gap, thereby electroerosively removing material from the workpiece and wherein as material removal proceeds the tool and workpiece electrodes are advanced relatively towards one another in a predetermined feed direction to form a cavity in the workpiece, the improvement comprising the steps of:

producing a localized magnetic field so that it is concentrated at least predominantly on a region of said machining gap which constitutes only a limited portion of a preselected entire area of juxtaposition between said tool and workpiece electrodes; and successively shifting said region of concentration of said magnetic field to sweep it over said entire area of juxtaposition between said tool and workpiece electrodes.

2. The improvement defined in claim 1 wherein said localized magnetic field is of a field strength in the range between 100 and 1000 Gauss.

3. The improvement defined in claim 2 wherein said field strength is in excess of 200 Gauss.

4. The improvement defined in claim 2 wherein said displacement of the localized magnetic field is effected at a rate of 0.1 to 100 Hz.

5. The improvement defined in claim 2 wherein said displacement of the localized magnetic field is effected at a speed of 1 to 100 m/sec.

6. The improvement defined in claim 1 wherein a plurality of electromagnetic coil means are disposed with each selectively energizable to provide the magnetic field at least preferentially at a preselected different location of said entire area, said coils being energized in sequence to displace said localized magnetic field.

7. The improvement defined in claim 6 wherein said plurality of electromagnetic oil means are arranged in an array which encompasses said area of juxtaposition between said tool electrode and workpiece electrode.

8. The improvement defined in claim 7 wherein said means are arranged in a plane generally perpendicular to said feed direction.

9. The improvement defined in claim 7 wherein said coil means are arranged in a plane generally including said feed direction.

10. The improvement defined in claim 6 wherein said plurality of electromagnetic means is arranged in an array within said tool electrode.

11. An electric discharge machining apparatus comprising:
an electric discharge machining electrode;
means for supporting a conductive workpiece in spaced juxtaposition with said electrode to define a machining gap therewith;
means for relatively displacing said electrode and said workpiece so that the generation of electric discharges across said gap progressively advances a recess in said workpiece;
means for feeding an electric discharge machining liquid to said gap to remove material erosively removed from said workpiece by said discharges;

means for applying a succession of machining electrical pulses across said electrode and said workpiece to produce said discharges across said gap;
field-generating means for producing a localized magnetic field so as to concentrate it predominantly on a region of said gap which constitutes only a limited portion of a preselected entire area of juxtaposition of said electrode with said workpiece; and
control means associated with said field-generating means for automatically displacing said concentrated magnetic field successively over further such regions of said machining gap, whereby said concentrated magnetic field ultimately sweeps over substantially said entire area of juxtaposition between said electrode and said workpiece.

12. The apparatus defined in claim 11 wherein said field-generating means includes a plurality of electromagnetic coils spaced apart and positioned to generate fields respectively affecting at least predominantly said regions, and said control means for displacing said field includes circuit means for energizing said coils in succession.

13. The apparatus defined in claim 12 wherein said coils are arranged in a plane, said means for relatively displacing said electrode and said workpiece including feed means for advancing said electrode perpendicular to said plane and into said workpiece to sink a cavity therein.

14. The apparatus defined in claim 12 wherein said coils are arranged in a plane parallel to the relative displacement of said electrode and workpiece.

15. The apparatus defined in claim 11, claim 12, claim 13 or claim 14 wherein said field-generating means is disposed wholly within said electrode and said electrode is hollow to receive said means for applying said magnetic field.

16. The apparatus defined in claim 15 wherein said means for successively displacing said magnetic field includes means for mechanically shifting at least one magnetic member within said electrode.

17. The apparatus defined in claim 16 wherein said member is a coil.

18. The apparatus defined in claim 16 wherein said member is one of a multiplicity of magnetically permeable bodies in said electrode.

19. The apparatus defined in claim 18 wherein said magnetically permeable bodies are interspersed with nonmagnetic bodies within said electrode.

20. The apparatus defined in claim 16 wherein said field-generating means includes at least one coil received in said electrode, at least one magnetic core in said electrode surrounded by the latter coil, and a mass of magnetically permeable bodies spaced from said core and conforming to the shape of said electrode and responsive to magnetic flux from said core to distribute said magnetic field.

21. The apparatus defined in claim 20, further comprising means for agitating said bodies.

22. The apparatus defined in claim 20 wherein said bodies are fibers.

* * * * *